(12) United States Patent
Golden et al.

(10) Patent No.: US 7,626,120 B1
(45) Date of Patent: Dec. 1, 2009

(54) POP-UP POWER AND COMMUNICATION OUTLET APPARATUS FOR USE WITH A TABLE, DESK OR SIMILAR ARTICLE

(75) Inventors: Kimberly Golden, Wallingford, CT (US); Dave Black, Orange, CT (US); Glenn Golden, Wallingford, CT (US); Russell Hayden, Stratford, CT (US); Jillian Pai, Chicago, IL (US); Sean Scott, Chicago, IL (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 12/113,003

(22) Filed: Apr. 30, 2008

Related U.S. Application Data

(60) Provisional application No. 60/928,297, filed on May 9, 2007, provisional application No. 60/927,196, filed on May 1, 2007.

(51) Int. Cl.
*H01H 9/02* (2006.01)
(52) U.S. Cl. .................. 174/53; 174/57; 174/486; 174/135; 174/484; 439/131; 361/827
(58) Field of Classification Search ............ 174/53, 174/57, 486, 135, 484, 500; 439/131, 925, 439/145, 344, 345; 361/827; 52/221; 220/3.7
See application file for complete search history.

(56) References Cited

U.S. PATENT DOCUMENTS

| | | | | |
|---|---|---|---|---|
| 3,622,684 A | * | 11/1971 | Press | ...................... 174/486 |
| 4,551,577 A | * | 11/1985 | Byrne | .......................... 174/57 |
| 4,792,881 A | * | 12/1988 | Wilson et al. | ............... 361/827 |
| 5,575,668 A | * | 11/1996 | Timmerman | ................ 439/131 |
| 6,234,812 B1 | * | 5/2001 | Ivers et al. | .................. 439/131 |

* cited by examiner

*Primary Examiner*—Dhiru R Patel
(74) *Attorney, Agent, or Firm*—Raymond A. Nuzzo

(57) ABSTRACT

A pop-up power and communication outlet apparatus having a hollow leg structure having an interior, a top end having an opening in communication with the interior of the hollow leg structure, and a bottom end. The apparatus also has a power and communication outlet structure that has a sleeve structure disposed within and attached to the hollow leg structure, and an outlet center movably disposed within the sleeve structure such that the outlet center can move vertically with respect to the sleeve structure. The outlet center has at least one power outlet or at least one communication outlet. In a preferred embodiment, the outlet center has a plurality of power outlets and a plurality of communication outlets. A lift mechanism is located within the sleeve structure and is connected between the sleeve structure and the outlet center. The lift mechanism urges the outlet center upward. A latch mechanism is attached to the sleeve structure and has a first configuration that retains the outlet center within the sleeve structure and a second configuration that allows the lift mechanism to lift the outlet center upward so the power and communication outlets are visible and accessible.

15 Claims, 9 Drawing Sheets

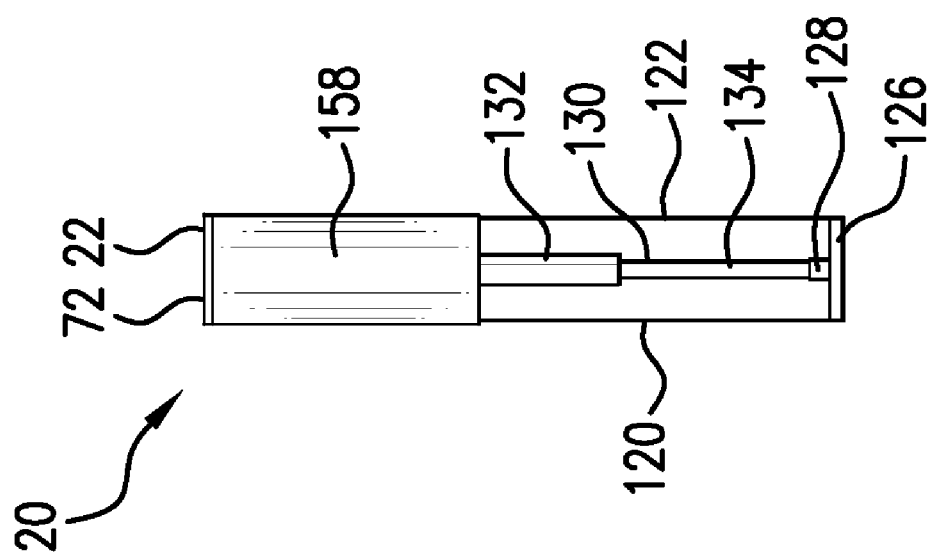
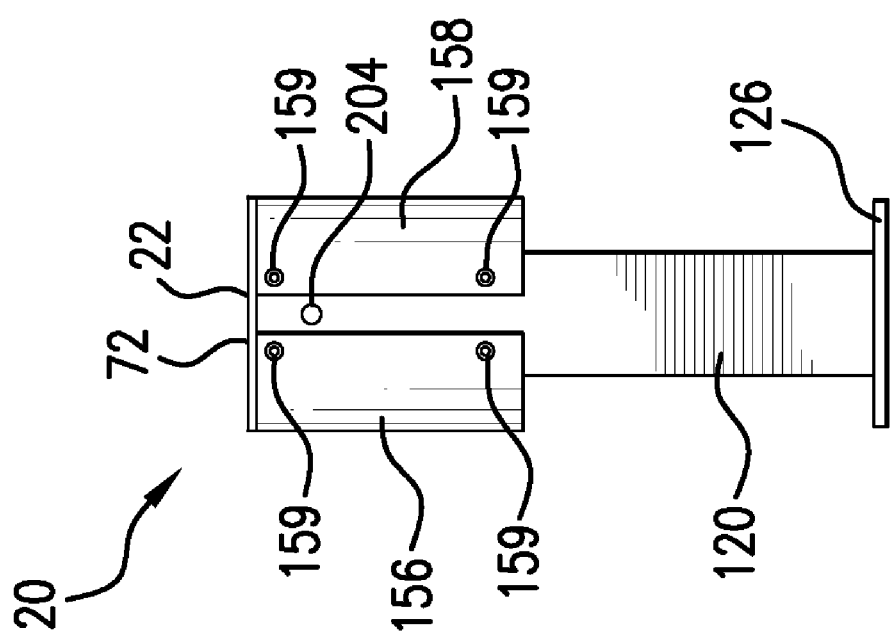

POP-UP POWER AND COMMUNICATION OUTLET APPARATUS FOR USE WITH A TABLE, DESK OR SIMILAR ARTICLE

CROSS-REFERENCE TO RELATED APPLICATIONS

This application claims the benefit of U.S. Provisional Application No. 60/928,297, filed May 9, 2007, and U.S. Provisional Application No. 60/927,196, filed May 1, 2007. The entire disclosures of application Nos. 60/928,297 and 60/927,196 are hereby incorporated by reference.

TECHNICAL FIELD

The present invention generally relates to a pop-up power and communication outlet apparatus that can be used with a furniture item such as a table, desk, work bench or similar article.

BACKGROUND ART

Retractable power outlets are known in the art and are described in U.S. Pat. Nos. 4,551,577 and 6,234,812. Specifically, U.S. Pat. No. 4,551,577 describes a retractable power source center that is adapted to be mounted in a furniture component. The '577 patent does not teach or suggest the pop-up power and communication outlet apparatus according to the claimed invention. U.S. Pat. No. 6,234,812 describes a retractable power and communication outlet for mounting on a work surface such as a table or desk. The '812 patent does not teach or suggest the pop-up power and communication outlet apparatus according to the claimed invention.

DISCLOSURE OF THE INVENTION

The present invention is directed to a pop-up power and communication outlet apparatus comprising a hollow leg structure comprising an interior, a top end having an opening in communication with the interior of the hollow leg structure, and a bottom end. The pop-up power and communication outlet apparatus further comprises a power and communication outlet structure that comprises a housing section disposed within and attached to the hollow leg structure, and an outlet center movably disposed within the housing section. The outlet center can move vertically with respect to the housing section. The outlet center comprises a plurality of power and/or communication outlets. A lift mechanism is located within the housing section and connected between the housing section and the outlet center. The lift mechanism urges the outlet center upward. A latch mechanism is attached to the housing section and has a first configuration that retains the outlet center within the housing section and a second configuration that allows the lift mechanism to lift the outlet center upward so the power and communication outlets are visible and accessible.

In a related aspect, the present invention is directed to a pop-up power and communication outlet apparatus comprising a hollow leg structure to be used as a support for a table, desk, work bench or similar article of furniture. The hollow leg structure has an interior, a top end having an opening in communication with the interior of the hollow leg structure, and a bottom end. The hollow leg structure further comprises a mounting member attached to the top end of the hollow leg structure. The mounting member has an opening therein that is substantially aligned with the opening in the top end of the hollow leg structure. The hollow leg structure further comprises a collar member attached to the mounting member such that the opening of the collar member is substantially aligned with the opening in the mounting member. The pop-up power and communication outlet apparatus further comprises a power and communication outlet structure comprising a housing section disposed within the hollow leg and attached to the collar member, and an outlet center movably disposed within the housing section such that the outlet center can move vertically with respect to the housing section. The outlet center comprises a plurality of power and/or communication outlets. The power and communication outlet structure further comprises a lift mechanism located within the housing section and connected between the housing section and the outlet center wherein the lift mechanism urges the outlet center upward. A latch mechanism is attached to the housing section and has a first configuration that retains the outlet center within the housing section and a second configuration that allows the lift mechanism to lift the outlet center upward so the power and communication outlets are visible and accessible. In order to configure the outlet center in a retracted state so that the outlet center is not visible, the user depresses the outlet center into the housing section until the latch mechanism is engaged thereby retaining the outlet center in the housing. In order to configure the outlet center in an extended state so that the outlet center is visible and accessible, the user slightly depresses the outlet center downward so to allow the latch mechanism to shift into the second configuration which allows the lift mechanism to lift the outlet center upward so that the power and communication outlets are exposed and accessible.

In another aspect, the present invention is directed to a pop-up power and communication outlet apparatus for use with a table, desk, work station or similar article. The pop-up power and communication outlet apparatus comprises a hollow leg structure to be used as a support for a table, desk, work station or similar article. The hollow leg structure has an interior, a top end having an opening in communication with the interior of the hollow leg structure, and a bottom end. A base is attached to the bottom end of the hollow leg structure. The hollow leg structure further comprises a mounting member that is attached to the top end of the hollow leg structure. The mounting member has a top surface and an opening substantially aligned with the opening in the top end of the leg structure. A collar member is attached to the top surface of the mounting member such that the opening of the collar member is substantially aligned with the opening in the mounting member and the opening in the top end of the hollow leg structure. The pop-up power and communication outlet apparatus further comprises a power and communication outlet structure. The power and communication outlet structure comprises a housing section that is disposed within the hollow leg structure and is attached to the collar member. An outlet center is movably disposed within the housing section such that the outlet center is able to move vertically. The outlet center comprises a plurality of power and communication outlets. A lift mechanism is located within the housing section and is connected between the housing section and the outlet center wherein the lift mechanism urges the outlet center upward. A latch mechanism is attached to the housing section and has a first configuration that retains the outlet center within the housing section and a second configuration that allows the lift mechanism to lift the outlet center upward so the power and communication outlets are visible and accessible. In order to configure the outlet center in a retracted state so that the outlet center is not visible, the user depresses the outlet center into the housing section until the latch mechanism is engaged thereby retaining the outlet center in the housing. In order to configure the outlet center in an extended state so that the outlet center is visible and accessible, the user slightly depresses the outlet center downward so to allow the latch mechanism to shift into the second configuration which allows the lift mechanism to lift the outlet center upward so that the power and communication outlets are exposed and accessible.

Further features and advantages of the present invention are described in the ensuing description.

DESCRIPTION OF THE DRAWINGS

The present invention will be more readily understandable from a consideration of the accompanying drawings, wherein:

FIG. 8 is a front view, in elevation, of the power and communication outlet structure wherein the outlet center is in the retracted state;

FIG. 9 is a side view, in elevation, of the power and communication outlet structure shown in FIG. 8;

BEST MODE FOR CARRYING OUT THE INVENTION

Figure 1:
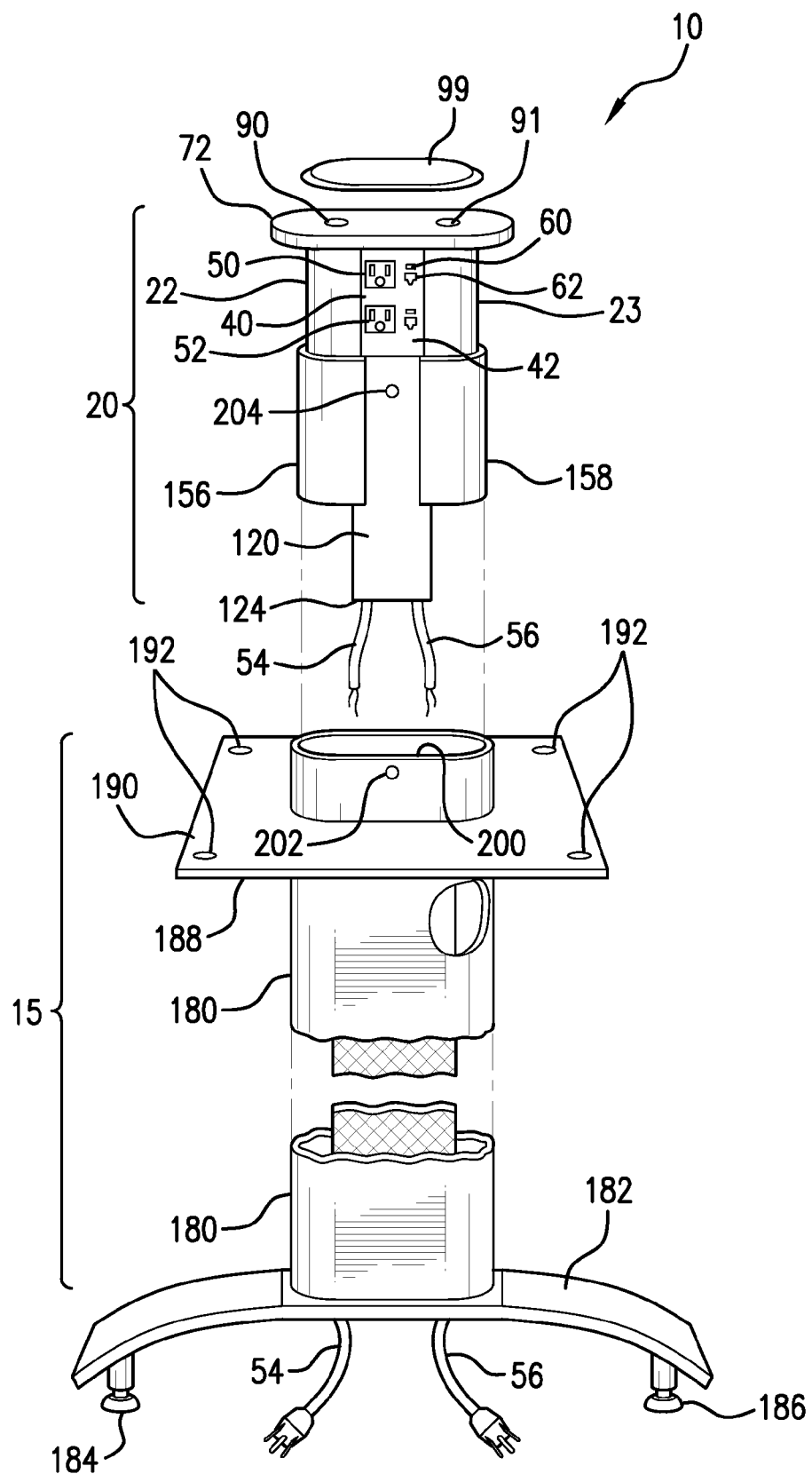
FIG. 1 is an exploded view of the pop-up power and communication outlet apparatus in accordance with a preferred embodiment of the present invention, the view showing a power and communication outlet structure and a hollow leg structure.

Referring to FIG. 1, there is shown power and communication outlet apparatus 10 in accordance with a preferred embodiment of the present invention. Apparatus 10 comprises leg structure 15 and power and communication outlet structure 20. Power and communication outlet structure 20 is connected to leg structure 15.

Figure 2:
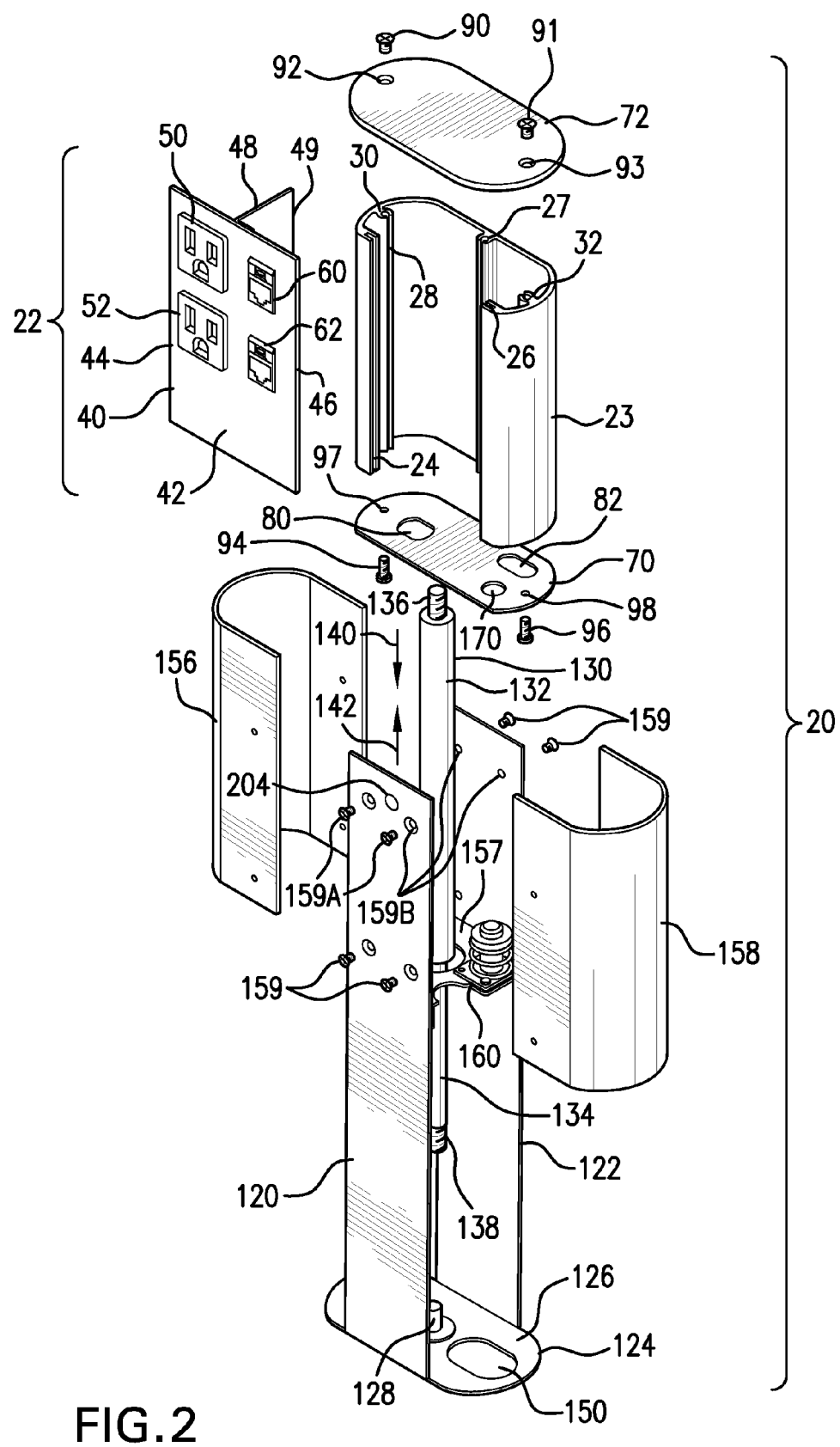
FIG. 2 is an exploded view of the power and communication outlet structure shown in FIG. 1.

Referring to FIGS. 1 and 2, power and communication outlet structure 20 generally comprises outlet center 22. Outlet center 22 comprises shell 23 which has tracks 24, 26 and 27 that extend for the entire length of shell 23. The purpose of tracks 24, 26 and 27 is discussed in the ensuing description. Shell 23 further includes screw receptacle tracks 30 and 32 that extend for the entire length of shell 23. Outlet center 22 comprises outlet support member 40 which has front panel 42, lengthwise edges 44 and 46, and rear plate 48. Rear plate 48 is connected to the rear side (not shown) of front panel 42 and is substantially perpendicular to front panel 42. Outlet support member 40 includes outlets 50 and 52 that are connected to front panel 42 and which are configured to provide A.C. voltages (e.g. 117 VAC) to power office or laboratory equipment, e.g. personal computers, oscilloscopes, etc. Wires 54 (see FIG. 1) are connected to connectors (not shown) on the rear of outlets 50 and 52 so as to provide electrical power from an electrical power source (not shown). Outlet support member 40 also includes communication outlets 60 and 62 that are connected to front panel 42. Communication outlets 60 and 62 provide connections to communication networks, e.g. telephone, internet, video, computer, broadband, DSL, etc. Wires 56 (see FIG. 1) are connected to connectors (not shown) on the rear of outlets 60, 62 and the aforesaid communication networks (not shown).

Figure 3:
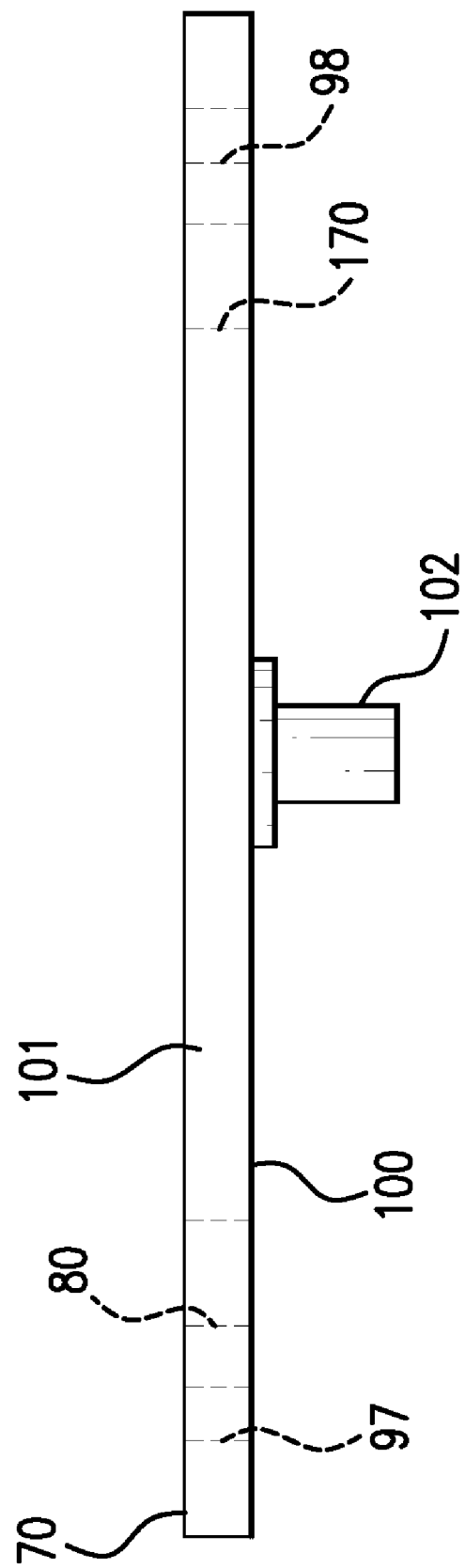
FIG. 3 is a side view of a base plate shown in FIG. 2.

Referring to FIG. 2, power and communication outlet structure 20 further comprises base plate 70 and cover plate 72 that are attached to shell 23. Prior to attaching base plate 70 and cover plate 72 to shell 23, outlet support member 40 is attached to shell 23 by inserting lengthwise edges 44 and 46 into tracks 24 and 26, respectively, of shell 23, and by inserting the lengthwise edge 49 of rear plate 48 into track 27 of shell 23. Wires 54 and 56 are fed through openings 80 and 170, respectively, in base plate 70. Cover plate 72 is attached to shell 23 via screws 90 and 91 that are inserted in throughholes 92 and 93, respectively, in cover plate 72. Screws 90 and 91 are then screwed into the screw inlets in the top of screw tracks 30 and 32, respectively. Base plate 70 is then attached to shell 23 by inserting screws 94 and 96 into through-holes 97 and 98, respectively, and then screwing screws 94 and 96 into the screw inlets at the bottom ends of screw tracks 30 and 32, respectively. Cap 99 is attached to cover plate 72 (see FIG. 1) by any suitable technique. Logos and/or designs may be printed or applied to cap 99. Referring to FIG. 3, base plate 70 includes a bottom side 100, top side 101, and nut 102 that is connected to bottom side 100. In a preferred embodiment, nut 102 is welded to bottom side 100. The purpose of nut 102 is explained in the ensuing description.

Referring to FIG. 2, power and communication outlet structure 20 further comprises vertical panel members 120 and 122 that are connected to base plate 124. Base plate 124 has basically the same geometric shape as base plate 70. Base plate 124 includes top side 126 and a threaded nut 128 that is connected to top side 126. In a preferred embodiment, nut 128 is welded to top side 126.

Referring to FIGS. 1-3, power and communication outlet structure 20 further comprises lift mechanism 130 which is located between vertical panel members 120 and 122. Lift mechanism 130 comprises a pressure spring device that has an outer cylindrical housing 132 and an inner cylindrical member 134 that is movably positioned within cylindrical housing 132. Cylindrical housing 132 and inner cylindrical member 134 can move with respect to each other. Specifically, cylindrical housing 132 moves axially upon inner cylindrical member 134. Outer cylindrical housing 132 has threaded member 136 that is screwed into threaded nut 102 that is attached to bottom side 100 of base plate 70. Inner cylindrical member 134 has a threaded end 138 that is screwed into threaded nut 128. Lift mechanism 130 is configured such that outer cylindrical housing 132 is normally urged upward in the direction indicated by arrow 142. However, when a downward force is applied to outlet center 22, the outer cylindrical member 132 moves downward with respect to the inner cylindrical member 134 and in the direction indicated by arrow 140 as shown in FIG. 2. Base plate 124 has through-hole therein, one of which being through-hole 150, to receive wires 54 and 56.

Referring to FIG. 2, sleeve members 156 and 158 are attached to vertical extending panels 120 and 122 with screws 159 and 159A that are inserted into through-holes 159B. Outlet center 22 is positioned within sleeves 156 and 158 and the upper portions of vertical panels 120 and 122. Outlet center 22 is able to move vertically, either up or down, within sleeves 156 and 158 and the upper portions of vertical panels 120 and 122.

Figure 4A:
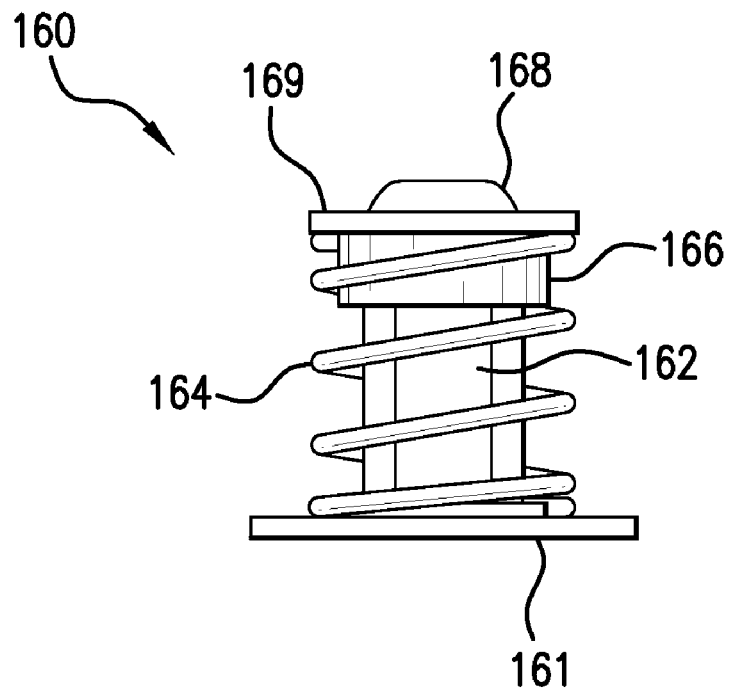
FIG. 4A is a side view, in elevation, of a latch mechanism shown in FIG. 2.
Figure 4B:
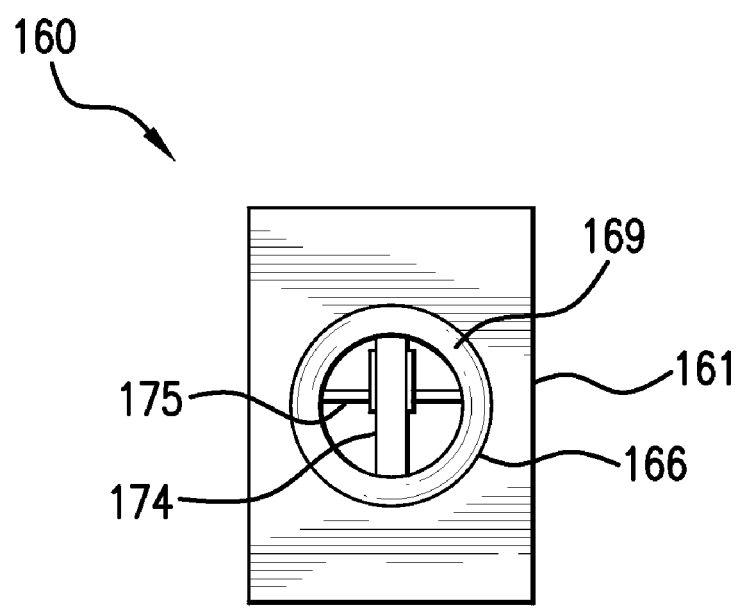
FIG. 4B is a top view of the latch mechanism shown in FIG. 4A.
Figure 5A:
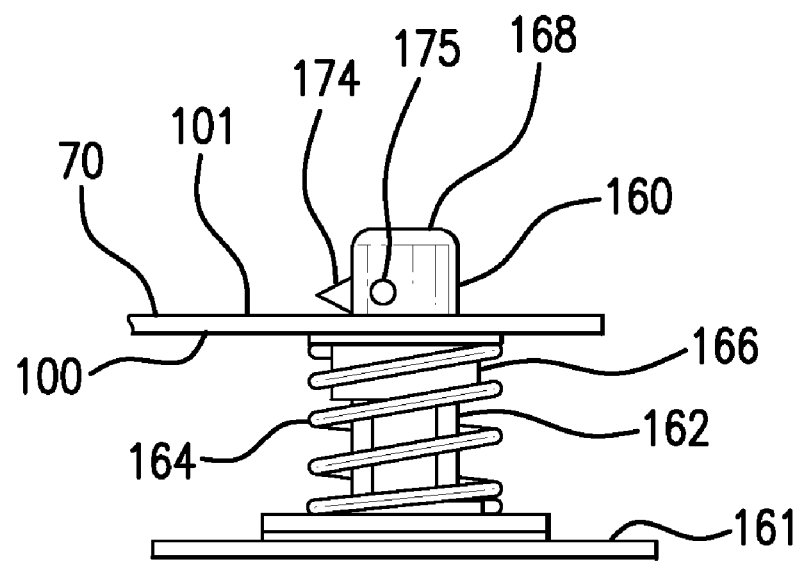
FIG. 5A is a side view, in elevation, of the latch mechanism shown in FIG. 4A, the view showing the latch mechanism in a latching state wherein the latch mechanism engages the base plate of an outlet center, shown in FIG. 2, so as to configure the outlet center in a retracted state.
Figure 5B:
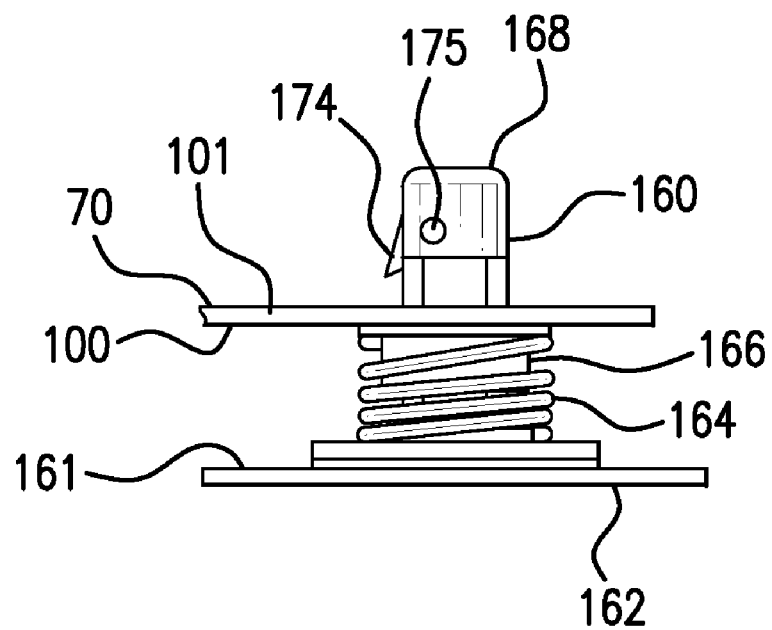
FIG. 5B is a side view, in elevation, of the latch mechanism configured in a releasing state.

Referring to FIGS. 2, 4A, 4B, 5A and 5B, power and communication outlet structure 20 further comprises latch mechanism 160. In a preferred embodiment, latch mechanism 160 is mounted to support plate 157. Support plate 157 is attached to vertically extending panels 120 and 122. In a preferred embodiment, latch mechanism 160 is configured as a Southco® A4 Push-To-Close Latch Concealed, Pinlatch (Part Number A4-20-501-10) manufactured by Southco of Concordville, Pa. Latch mechanism 160 comprises base 161, body 162, spring 164, slide 166 and head 168. Slide 166 has a top portion 169. Body 162 is connected to base 161. Slide 166 is slidably mounted on body 162. Head 168 is sized to fit into through-hole 82 of base plate 70. Latch mechanism 160 comprises locking cam 174 that is movably positioned within body 162. Specifically, locking cam 174 is pivotally attached to body 162 at pivot point 175. Spring 164 urges slide 166 to an extended position as shown in FIG. 4A. Latch mechanism 160 includes an internal spring (not shown) and a ball (not shown) that are internal to body 162. The aforesaid internal spring and ball provide a force that urges locking cam 174 into a 90° position that is shown in FIG. 5A. However, slide 166 retains locking cam 174 in a vertical position when slide 166 is in the extended position as shown in FIG. 4A. Latch mechanism 160 works in conjunction with lift mechanism 130 to configure outlet center 22 in an extended state and in a retracted state. When outlet center 22 is pushed downward so as to counteract the upward urging force produced by lift mechanism 130, base plate 70 contacts latch mechanism 160 such that head 168 is inserted into opening 82 in base plate 70 and top portion 169 contacts bottom surface 100 of base plate 70. As outlet center 22 moves downward, slide 166 moves downward and compresses spring 164. Thus, when slide 166 moves downward past pivot point 175, spring 164 becomes compressed and the internal spring and ball (not shown) in body 162 cause locking cam 174 to shift into the 90° position as shown in FIG. 5A. When locking cam 174 is shifted into the 90° position, locking cam 174 engages top surface 101 of base plate 70 and counteracts the force of compressed spring 164. Thus, outlet center 22 is now in the retracted state. In order to disengage locking cam 174 from base plate 70 so as to configure outlet center 22 in the extended state, the user slightly depresses outlet center 22 so that slide 166 moves downward a relatively small distance. This downward movement of slide 166 causes locking cam 174 to become disengaged from top surface 101 of base plate 70 (see FIG. 5B). This downward force on slide 166 counteracts the internal spring (not shown) and ball (not shown) that are internal to body 162 and causes locking cam 174 to shift into a vertical orientation (see FIG. 5B). This enables spring 164 to push base plate 70 upward past pivot point 175 and allow lift mechanism 130 to lift outlet center 22 to the extended position.

Referring to FIGS. 1 and 2, leg structure 15 generally comprises hollow leg tubing 180 which is connected to leg base 182. Leg base 182 includes adjustable feet members 184 and 186. Leg structure 15 further comprises mounting plate member 188 that is connected to leg tubing 180. Mounting plate 188 has top surface 190 and a plurality of through-holes 192 for receiving screws or fasteners 193 (see FIGS. 10 and 11). Leg structure 15 further comprises collar member 200 that is attached to top surface 190 of mounting plate 188. In a preferred embodiment, collar member 200 has the same shape as leg tubing 180. Collar member 200 and leg tubing 180 are sized to receive power and communication outlet structure 20. Specifically, power and communication outlet structure 20 is disposed within collar member 200 and leg tubing 180. Set screws (not shown) are used to attach power and communication outlet structure 20 to collar member 200. For example, a set screw (not shown) is inserted through through-hole 202 and into screw inlet 204 in vertical panel 120 in order to attach power and communication outlet structure 20 to collar member 200. More than one screw or other fastener device is used to attach power and communication outlet structure 20 to collar member 200. In one embodiment, collar 200 and hollow leg tubing 180 have substantially oval cross-sections.

Figure 7:
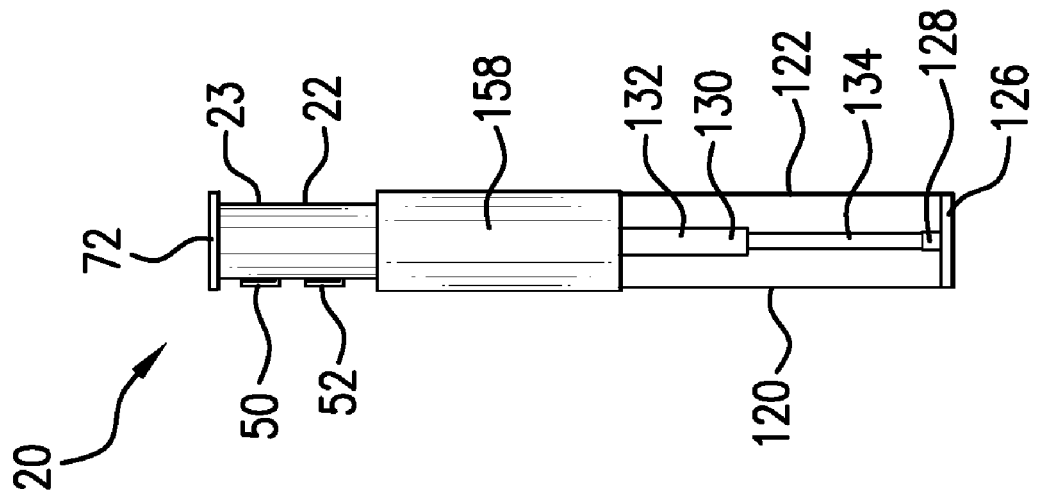
FIG. 7 is a side view, in elevation, of the power and communication outlet structure shown in FIG. 6.
Figure 6:
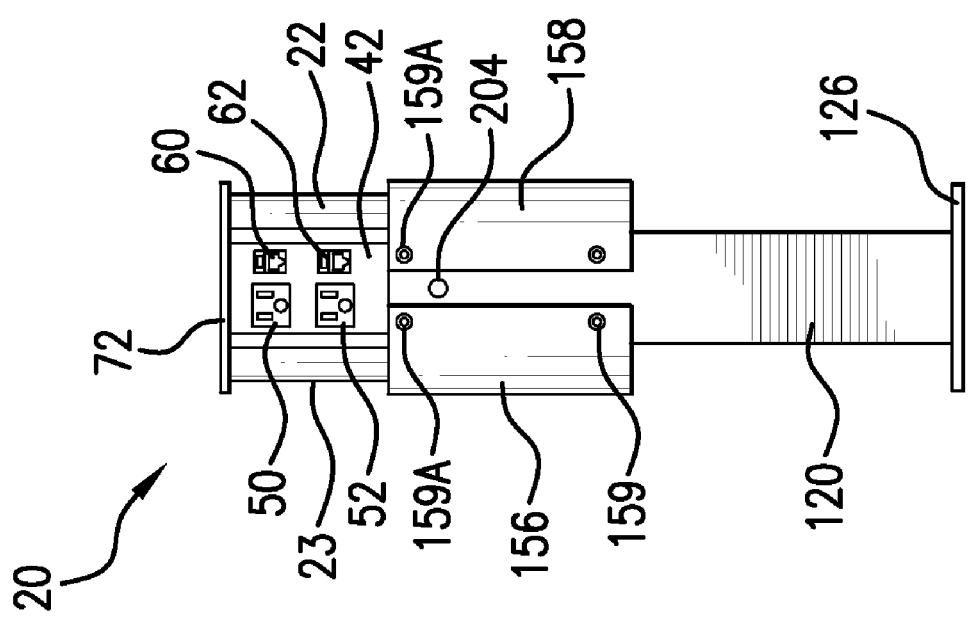
FIG. 6 is a front view, in elevation, of the completely assembled power and communication outlet structure of FIG. 2 wherein the outlet center is in the extended state.

Referring to FIGS. 6 and 7, there is shown pop-up power and communication outlet structure 20 with outlet center 22 in the extended position wherein outlets 50, 52, 60 and 62 are exposed and accessible. FIGS. 8 and 9 show power and communication outlet structure 20 wherein outlet center 22 is retracted into sleeve sections 156 and 158 so that outlets 50, 52, 60 and 62 are no longer exposed and accessible.

Figure 10:
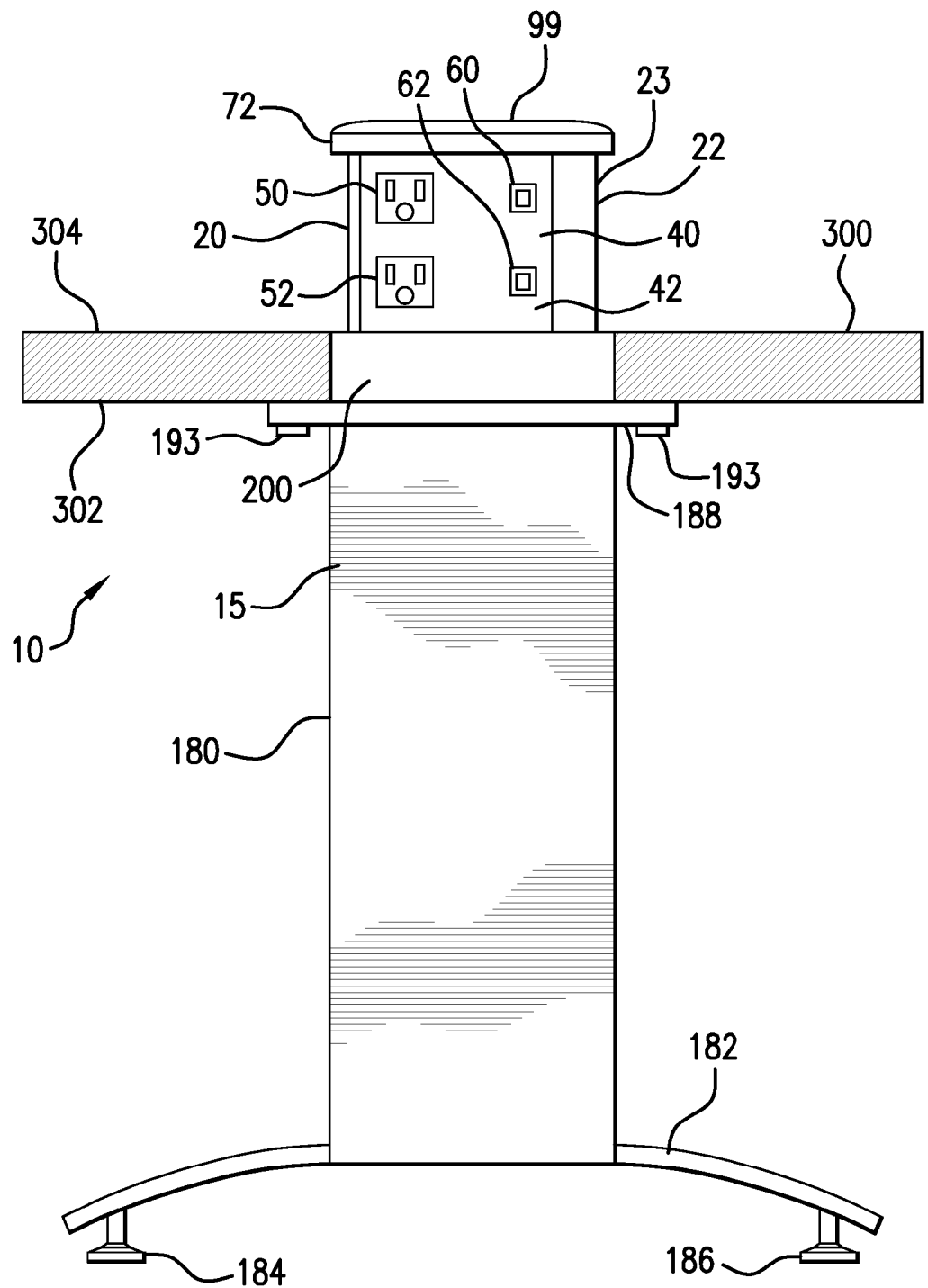
FIG. 10 is an elevational view, partially in cross-section, of the power and communication outlet apparatus of the present invention integrated with a table, the outlet center being shown in an extended state.
Figure 11:
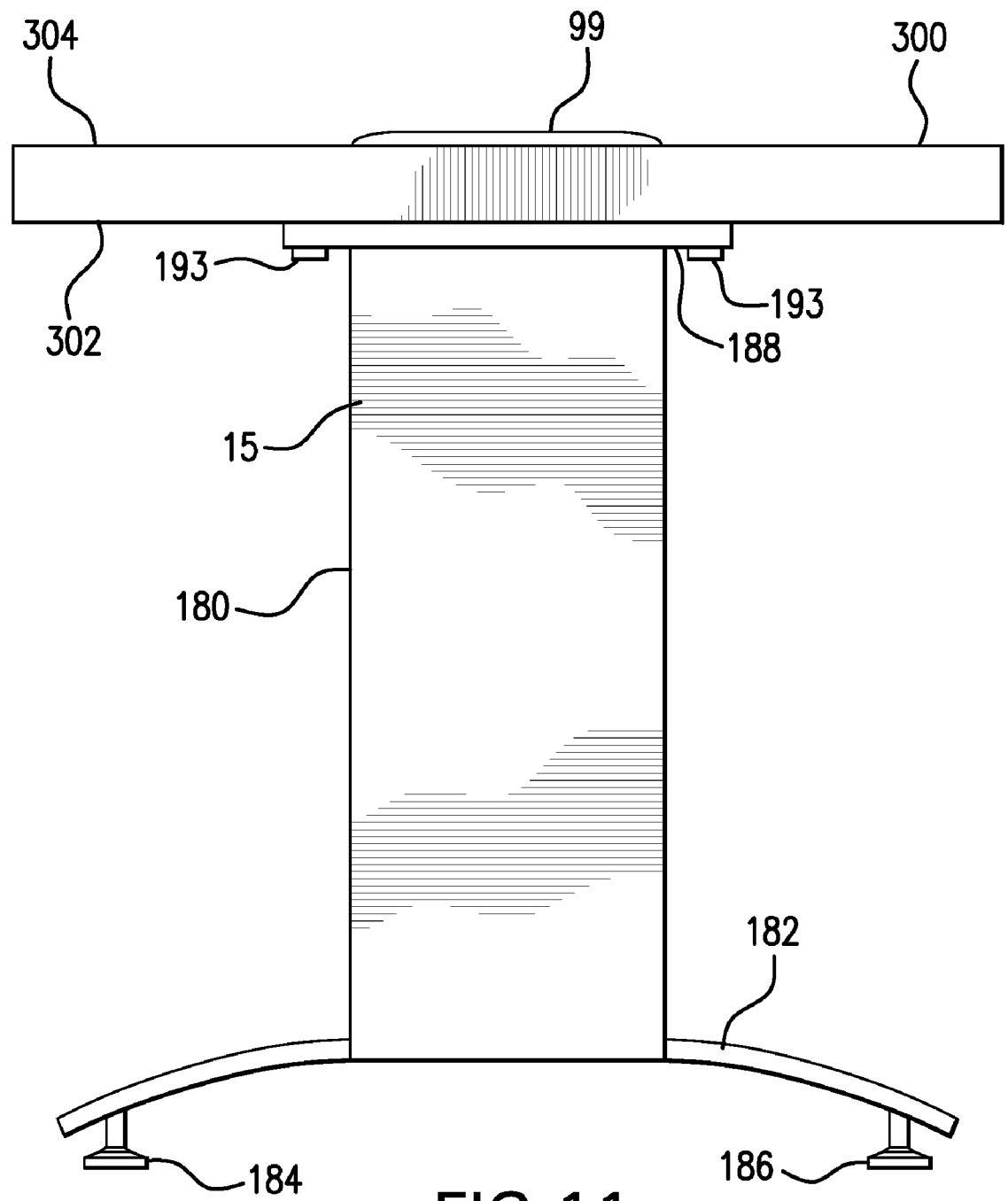
FIG. 11 is an elevational view of the power and communication outlet apparatus as shown in FIG. 10, the outlet center being shown in a retracted state.

Referring to FIG. 10, there is shown pop-up power and communication outlet apparatus 10 operatively connected to table 300. Mounting plate 188 is attached to bottom side 302 of table 300 such that top surface 190 of mounting plate 188 abuts bottom side 302 of table 300. Fastener or screws 193 are inserted through through-holes 192 and attach mounting plate 188 to bottom side 302. Outlet center 22 is in the extended or "popped-up" state wherein outlets 50, 52, 60 and 62 are positioned above top surface 304 of table 300. In order to retract outlet center 22 so that outlets 50, 52, 60 and 62 are no longer exposed, the user places his or her hand over cap 99 and depresses outlet center 22 so that outlet center 22 moves downward between sleeve sections 156 and 158 until latch mechanism 160 engages base plate 70. Once latch mechanism 160 engages base plate 70, outlet center 22 remains below top surface 304 and in the retracted position (see FIG. 11). When outlet center 22 is in the retracted position, power and communication outlets 50, 52, 60 and 62 are neither exposed nor accessible. When outlet center 22 is retracted, only cap 99 is exposed. In order to configure apparatus 10 in the extended state so that outlet center 22 is positioned above top surface 304 of table 300, the user gently presses downward upon cap 99 so as to counter-act the upward, urging force of lift mechanism 130. This causes outlet center 22 to move downward a slight distance which results in latch mechanism 160 being disengage from base plate 70. Once this occurs, the user can remove his or her hand from cap 99 and lift mechanism 130 automatically lifts power outlet center 22 upward so that outlets 50, 52, 60 and 62 are positioned above top surface 304 of table 300.

A variety of materials may be used to fabricate apparatus 10, e.g. plastic, metals, resins, composites, etc.

It is to be understood that the invention is not limited to the illustrations described and shown herein, which are deemed to be merely illustrative of the best modes of carrying out the invention, and which are susceptible of modification of form, size, arrangement or position of parts, and details of operation. Rather, the invention is intended to encompass all such modifications which are within the spirit and scope as defined by the claims.

What is claimed is:

1. A pop-up power and communication outlet apparatus comprising:
   a hollow leg structure comprising an interior, a top end having an opening in communication with the interior of the hollow leg structure, and a bottom end;
   a power and communication outlet structure comprising:
      a sleeve structure disposed within and attached to the hollow leg structure,
      an outlet center movably disposed within the sleeve structure such that the outlet center can move vertically with respect to the sleeve structure, the outlet center comprising at least one power outlet or at least one communication outlet,
      a lift mechanism located within the sleeve structure and connected between the sleeve structure and the outlet center wherein the lift mechanism urges the outlet center upward, and
      a latch mechanism attached to the sleeve structure and having a first configuration that retains the outlet center within the sleeve structure and a second configuration that allows the lift mechanism to lift the outlet center upward so the power and communication outlets are visible and accessible.

2. A pop-up power and communication outlet apparatus comprising:
   a hollow leg structure to be used as a support for a table, desk, work bench or workstation, the hollow leg structure having an interior, a top end having an opening in communication with the interior of the hollow leg structure, and a bottom end, the hollow leg structure further comprising a mounting member attached to the top end of the hollow leg structure, the mounting member having an opening therein that is substantially aligned with the opening in the top end of the hollow leg structure, the hollow leg structure further comprising a collar member attached to the mounting member such that the opening of the collar member is substantially aligned with the opening in the mounting member;
   a power and communication outlet structure comprising:
      a sleeve structure disposed within the hollow leg structure and attached to the collar member,
      an outlet center movably disposed within the sleeve structure such that the outlet center can move vertically with respect to the sleeve structure, the outlet center comprising at least one power outlet or at least one communication outlet,
      a lift mechanism located within the sleeve structure and connected between the sleeve structure and the outlet center wherein the lift mechanism urges the outlet center upward,
      a latch mechanism attached to the sleeve structure and having a first configuration that retains the outlet center within the sleeve structure and a second configuration that allows the lift mechanism to lift the outlet center upward so the power and communication outlets are visible and accessible; and
      wherein in order to configure the outlet center in a retracted state so that the outlet center is not visible, the user depresses the outlet center into the sleeve structure until the latch mechanism is engaged thereby retaining the outlet center in the sleeve structure and wherein in order to configure the outlet center in an extended state so that the outlet center is visible and accessible, the user slightly depresses the outlet center downward so to allow the latch mechanism to shift into the second configuration which allows the lift mechanism to lift the outlet center upward so that the power and communication outlets are exposed and accessible.

3. The pop-up power and communication outlet apparatus according to claim 2 wherein the lift mechanism comprises a pressure spring device.

4. The pop-up power and communication outlet apparatus according to claim 2 wherein the hollow leg structure has a bottom and the pop-up power and communication outlet apparatus further comprises a leg base that is attached to the bottom of the hollow leg structure and has adjustable feet members.

5. The pop-up power and communication outlet apparatus according to claim 2 wherein the hollow leg structure further comprises a mounting member between the top end of the hollow leg structure and the collar member.

6. The pop-up power and communication outlet apparatus according to claim 5 wherein the hollow leg structure has a longitudinally extending axis and the mounting member is substantially perpendicular to the longitudinally extending axis of the hollow leg structure.

7. The pop-up power and communication outlet apparatus according to claim 2 wherein the outlet center comprises a shell to which the power and communication outlets are secured, and wherein the shell has a top end and a bottom end.

8. The pop-up power and communication outlet apparatus according to claim 7 wherein the outlet center further comprises a cover plate attached to the top end of the shell.

9. The pop-up power and communication outlet apparatus according to claim 8 further comprising a cap that is attached to the cover plate of the outlet center.

10. The pop-up power and communication outlet apparatus according to claim 8 wherein the outlet center further comprises a base plate attached to the bottom end of the shell.

11. The pop-up power and communication outlet apparatus according to claim 10 wherein the lift mechanism is vertically oriented and is connected between a lower portion of the housing section and the base plate of the outlet center.

12. The pop-up power and communication outlet apparatus according to claim 2 wherein the hollow leg structure has a generally oval cross-section.

13. The pop-up power and communication outlet apparatus according to claim 2 wherein the collar member has a generally oval cross-section.

14. The pop-up power and communication outlet apparatus according to claim 2 further comprising a plurality wires disposed through hollow leg structure and connected to the power and communication outlets.

15. A pop-up power and communication outlet apparatus integrated with a work surface comprising:
   a hollow leg structure having an interior, a top end having an opening in communication with the interior of the hollow leg structure, and a bottom end, the hollow leg structure further comprising a mounting plate joined to the top end of the hollow leg structure and being substantially perpendicular to the longitudinally extending axis of the hollow leg structure, the mounting plate having a top surface and an opening substantially aligned with the opening in the top end of the leg structure, the hollow leg structure further comprising a collar member joined to the top surface of the mounting plate such that the opening of the collar member is substantially aligned with the opening in the mounting plate and the opening in the top end of the hollow leg structure;

a work surface having a bottom side and an opening sized to receive the collar member;

wherein the collar member is positioned in the opening in the work surface such that the top surface of the mounting plate abuts the bottom side of the work surface and the hollow leg structure supports the work surface;

a power and communication outlet structure comprising:
 a sleeve structure disposed within the hollow leg and attached to the collar member,
 an outlet center movably disposed within the sleeve structure such that the outlet center can move vertically, the outlet center comprising a cover member and a at least one power outlet or at least one communication outlet,
 a lift mechanism located within the sleeve structure and connected between the sleeve structure and the outlet center wherein the lift mechanism urges the outlet center upward,
 a latch mechanism attached to the sleeve structure and having a first configuration that retains the outlet center within the sleeve structure and a second configuration that allows the lift mechanism to lift the outlet center upward so the power and communication outlets are visible and accessible; and wherein in order to configure the outlet center in a retracted state so that the outlet center is not visible, the user depresses the outlet center into the sleeve structure until the latch mechanism is engaged thereby retaining the outlet center in the sleeve structure, and wherein in order to configure the outlet center in an extended state so that the outlet center is visible and accessible, the user slightly depresses the outlet center downward so to allow the latch mechanism to shift into the second configuration which allows the lift mechanism to lift the outlet center upward so that the power and communication outlets are exposed and accessible; and wherein when the outlet center is in the retracted state, the outlet center is positioned within the sleeve structure and the power and communication outlets are neither visible nor accessible and only the cover plate of outlet center is visible, and wherein when the outlet center is in the extended position, the outlet center is exposed such that the power and communication outlets are accessible and positioned above the work surface.

* * * * *